United States Patent
Suzuki et al.

[11] Patent Number: 5,190,125
[45] Date of Patent: Mar. 2, 1993

[54] VACUUM BRAKE BOOSTER

[75] Inventors: Kazuhiko Suzuki; Akihiko Miwa; Yuzuru Sugiura; Satoshi Kawasumi, all of Aichi, Japan

[73] Assignee: Aisin Seiki Kabushiki Kaisha, Kariya, Japan

[21] Appl. No.: 841,779

[22] Filed: Mar. 2, 1992

Related U.S. Application Data

[63] Continuation of Ser. No. 470,350, Jan. 25, 1990, abandoned.

[30] Foreign Application Priority Data

Jan. 25, 1989 [JP] Japan .................. 1-007342
Nov. 16, 1989 [JP] Japan .................. 1-133412

[51] Int. Cl.$^5$ ............................. F16B 9/10
[52] U.S. Cl. .......................... 188/357; 60/547.1
[58] Field of Search ............ 188/356, 357; 303/4, 303/12, 114 PN; 60/547.1; 91/367.1

[56] References Cited

U.S. PATENT DOCUMENTS

| | | | |
|---|---|---|---|
| 3,362,298 | 1/1968 | Julow | 60/547.1 X |
| 4,325,218 | 4/1982 | Weiler et al. | 60/547.1 |
| 4,394,833 | 7/1983 | Weiler et al. | 60/547.1 |
| 4,447,897 | 5/1984 | Boehm | 60/547.1 |
| 4,522,031 | 6/1985 | Kytta et al. | 60/547.1 |
| 4,712,468 | 12/1987 | Blot | 60/547.1 |
| 4,936,635 | 6/1990 | Sakaguchi | 303/4 |

FOREIGN PATENT DOCUMENTS

| 2155169 | 5/1973 | Fed. Rep. of Germany | 60/547.1 |
|---|---|---|---|
| 57-92569 | 6/1982 | Japan | |

Primary Examiner—Matthew C. Graham
Attorney, Agent, or Firm—Burns, Doane, Swecker & Mathis

[57] ABSTRACT

A vacuum brake booster includes a secured arrangement for securing a flange portion of a control valve element to a cylindrical portion of the power piston so as to prevent relative movement between the flange portion of the control valve element and the power piston. Thereby, the seal surface of the control valve element is not urged toward the valve seat of the power piston by a pressure differential applied to the flange portion. The urging force of a second coil spring arrangement which urges the control valve element to separate from the valve seat in the non-operating condition of the vacuum brake booster is positively decreased without exerting an adverse influence to the control of the braking force of the vacuum brake booster (10). Accordingly, the input load of the vacuum brake booster is decreased and the operational feeling of the braking action is improved.

14 Claims, 3 Drawing Sheets

VACUUM BRAKE BOOSTER

This application is a continuation of application Ser. No. 07/470,350, filed Jan. 25, 1990, now abandoned.

BACKGROUND OF THE INVENTION

1. Field of the Invention

The present invention relates to a vacuum brake booster which reduces the force required for operating a pedal-operated brake system of vehicles and, more particularly, to a control valve mechanism which is operated by a push rod linked to the brake pedal which controls a pressure differential between front and rear chambers in the housing of the booster.

2. Description of the Related Art

A prior type vacuum brake booster for use in vehicles is described, for example, in Japanese Utility Model Laid-Open Publication No. 57-92569 published on Jun. 7, 1982.

The vacuum brake booster includes a power piston which divides an interior of a body into a variable pressure chamber and a constant pressure chamber constantly applying a negative pressure and a control valve mechanism for controlling a pressure differential between the variable pressure chamber and the constant pressure chamber in the body. The control valve mechanism includes a valve plunger slidably received in a power piston which is linked to the brake pedal via a push rod and a control valve element secured to the power piston at one end portion thereof and having a seal surface at its other end portion. The seal surface of the control valve element is normally urged by a first coil spring disposed in the power piston and which is in contact with a seat surface of the end portion of the valve plunger. The control valve element is secured in an air tight manner to the cylindrical portion of the power piston at its outer circumference portion by a retainer engaging a second coil spring which urges the push rod toward the brake pedal. The control valve element is provided with a rolling portion which is flexible in the axial direction so as to force the seal surface to follow the movement of the push rod and includes a barrel-shaped portion and a flange portion normally subject to atmospheric pressure and negative pressure (vacuum) at the inner and outer surfaces, respectively.

In this prior arrangement, when the brake pedal is depressed, the control valve element and the valve plunger are linked to the brake pedal by the first coil spring against the second coil spring, and the seal surface of the control valve element is contacted by a valve seat of the power piston and the communication between the variable pressure chamber and the constant pressure chamber is interrupted. Thereafter, the seat surface of the end portion of the valve plunger is separated or removed from the seal surface of the valve plunger, whereupon atmospheric pressure is introduced into the variable pressure chamber and a pressure differential is produced between the variable pressure chamber and the constant pressure chamber so that the desired operational pressure force is produced by the push rod.

In this prior arrangement, the retainer is extended along the inner direction to the inner surface of the flange portion of the rolling portion. An inner circumference edge portion of the retainer is extended up to about the middle portion of the flange portion in order to ensure the performance of the flexibility so as to be able to follow to the movement of the push rod. However, the atmospheric pressure and the negative pressure are normally applied to the inner and outer surface of the circular areas from about the middle portion to an inner circumference edge portion of the flange portion, respectively. Thereby, the control valve element is urged toward the valve seat of the power piston by the pressure differential between the atmospheric pressure and the negative pressure. Since it is necessary to separate the control valve element with the push rod from the seat surface of the power piston against the pressure differential when the brake pedal is not depressed in order to control the braking force in response to the brake pedal, it is necessary to enlarge the predetermined load of the second coil spring as a second urging force. Consequently, since the depressing force of the brake pedal is increased in the first stage of the depression of the brake pedal and the input load of the vacuum booster is increased, the prior arrangement has a drawback in that it produces an adverse influence on the operational feel of the brake operation.

SUMMARY OF THE INVENTION

It is therefore, an object of the present invention to decrease the urging force of the second urging means without exerting an adverse influence on the control of the braking force of the vacuum booster.

It is another object of the present invention to decrease the input load of the vacuum booster and to improve the operational feel of the brake operation.

It is a further object of the present invention to reduce the cost of manufacturing the vacuum booster.

In order to achieve these objects, there is provided an improved vacuum brake booster which includes a push rod movable in an axial direction in response to movements of a brake pedal. A housing includes a front shell and a rear shell connected with each other and with a power piston located in the housing dividing the interior of the housing into a constant pressure chamber and a variable pressure chamber with a diaphragm. The power piston is responsive to a pressure differential between the constant pressure chamber and the variable pressure chamber. A valve plunger is operatively connected with a front end portion of the push rod and located within the power piston and a control valve element is located in the power piston and has a seal surface normally in contact with a seat surface of the valve plunger by the urging force provided by a first urging means.

The control valve element has a rolling portion open to the atmospheric pressure and a negative pressure (vacuum) to its inner and outer surface, respectively, and includes a flange portion and a barrel-shaped portion flexible in an axial direction in response to axial movement of the push rod. The control valve element is secured in an air-tight manner to a cylindrical portion of the power piston at its outer circumference portion by a retainer for engaging a second urging means urging the push rod toward the brake pedal. The power piston has a valve seat contactable with the control valve element so that upon contacting of the control valve element and the valve seat of the power piston, fluid communication between the constant pressure chamber and the variable pressure chamber is interrupted. The seat surface of the valve plunger is separable from the control valve element so as to produce the pressure differential between the constant pressure chamber and the variable pressure chamber. The flange portion of the control valve element is secured to the cylindrical portion of the power piston so as to prevent relative movement between the flange portion of the control valve element and the power piston.

BRIEF DESCRIPTION OF THE DRAWINGS

Various other objects, features and attendant advantages of the present invention will be more fully appreciated from the following detailed description when considered in connection with the accompanying drawings in which like reference characters designate like or corresponding parts throughout the several views and wherein.

DESCRIPTION OF THE PREFERRED EMBODIMENTS

A vacuum brake booster constructed in accordance with preferred embodiments of the present invention will be described with reference to the drawings.

Figure 1:
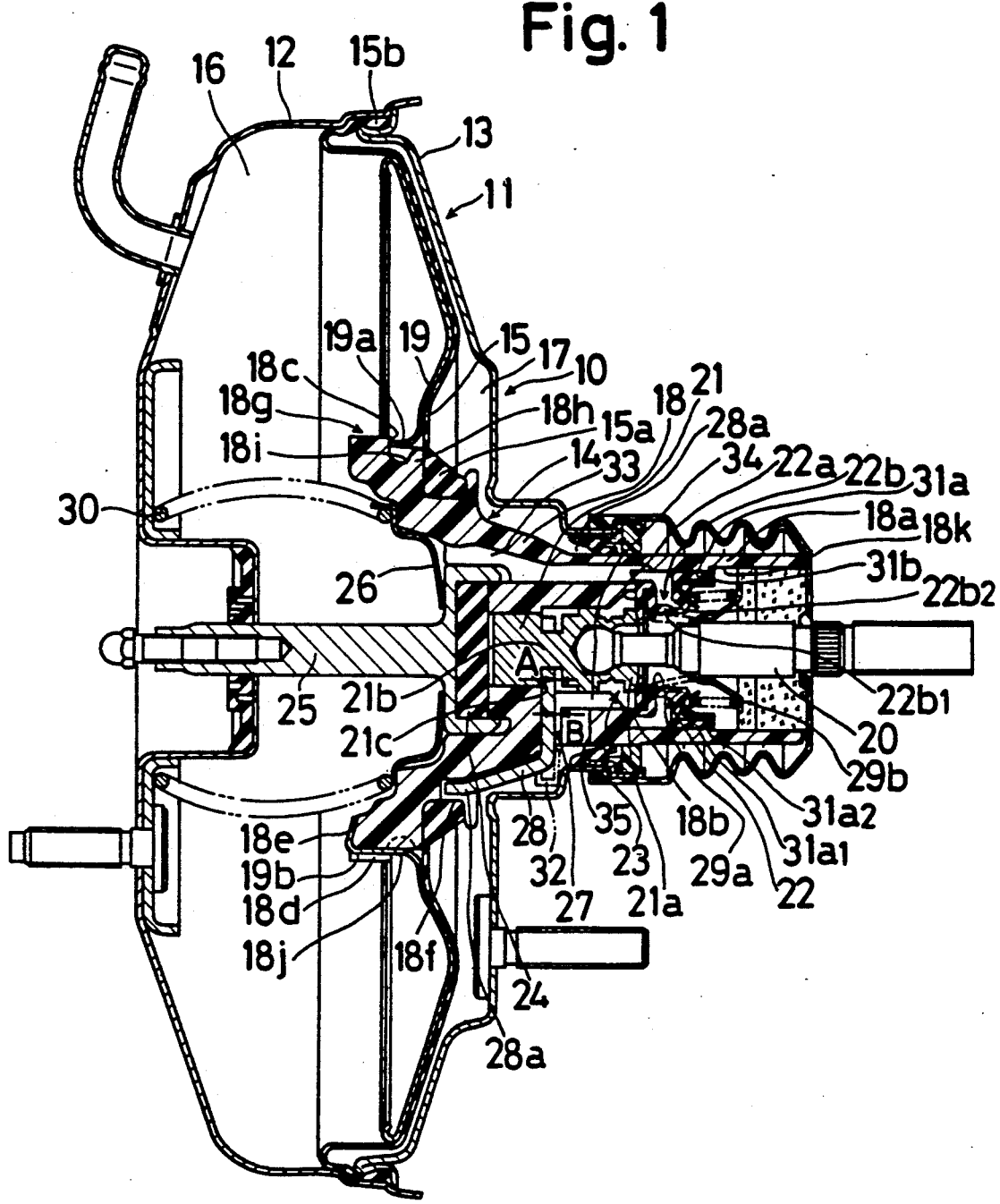
FIG. 1 is a sectional view of a first embodiment of the vacuum brake booster.
Figure 2:
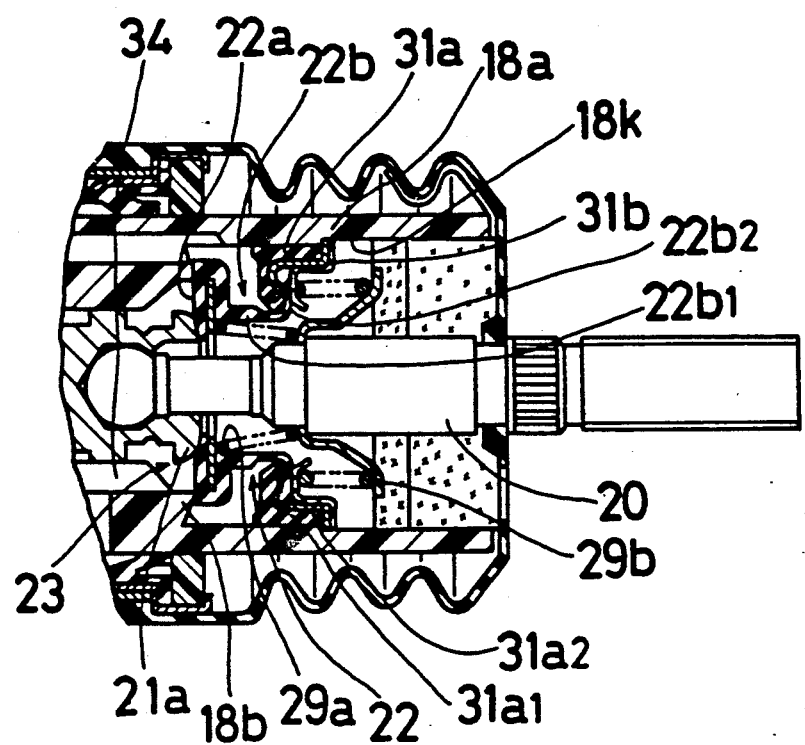
FIG. 2 is a partial enlarged section view of a first embodiment of the vacuum brake booster.

Referring to FIG. 1 and FIG. 2, a vacuum brake booster 10 according to a preferred embodiment of the present invention is provided for assisting the operation of automobile brakes (not shown). The vacuum brake booster 10 includes a body 11 comprising a front shell 12 and a rear shell 13 connected with each other by a suitable, known, connecting mechanism. The interior space enclosed by the body 11 is divided into a constant pressure chamber 16 and a variable pressure chamber 17 by a power piston 14 and diaphragm 15 made of a rubber or similar elastic material. The power piston 14 comprises a piston body 18 made of a resinous material and a pressure plate 19 integrally connected to the piston body 18. An outer bead portion 15b of the diaphragm 15 is hermetically clamped between the front shell 12 and the rear shell 13. The inner bead 15a of the diaphragm 15 is air-tightly fitted in an outer groove 18f of the piston body 18. The constant pressure chamber 16 communicates with a vacuum source (for example, to the intake manifold of an engine). As a result, the constant pressure chamber 16 is normally maintained in a state of vacuum. The variable pressure chamber 17 is selectively communicated with the constant pressure chamber 16 or the atmosphere by a control valve mechanism 23 provided in the piston body 18. The piston body 18 has a cylindrical portion 18a extending rearwardly (to the right of FIG. 1) and protruding at the right end thereof outwardly from the rear wall of the rear shell 13.

A seal member (not indicated) is inserted between the rear wall of the rear shell 13 and the outer surface of the cylindrical portion 18a of the piston body 18 to support the cylindrical portion 18a in an air-tight manner.

The piston body 18 of the power piston 14 has a groove at the left end surface thereof and an output rod 25, which pushes a master cylinder piston (not shown), is inserted in the groove of the piston body 18 through a reaction disc 24 made of a rubber material. The reaction disc 24 transmits the reaction force to a push rod 20 when the brake pedal (not shown) is depressed more than the predetermined value and a small space is formed between the reaction disc 24 and a valve plunger 21 when the brake pedal is not depressed. The output rod 25 is urged toward the right, as viewed in FIG. 1, so as to ensure the air-tightness between the reaction disc 24 and the piston body 18 and to prevent the key member 28 from dropping or moving out of position. A return spring 30 in the constant pressure chamber 16 is disposed between the inner wall of the front shell 12 and a stepped portion of the piston body 18 of the power piston 14. As a result, the power piston 14 is urged toward the right in FIG. 1 by the return spring 30. The piston body 18 is provided with a first air passage 33, which establishes fluid communication between the constant pressure chamber 16 and the variable pressure chamber 17, and second air passages 34 and 35, which introduce ambient air into the variable pressure chamber 17 through the control valve mechanism 23.

The piston body 18 of the power piston 14 has a hollow portion 18k formed in the center thereof, within which the control valve mechanism 23 is located in order to control the pressure differential between the constant pressure chamber 16 and the variable pressure chamber 17. The control valve mechanism 23 comprises the push rod 20, the valve plunger 21, a control valve element 22 made of a rubber material, a first coil spring 29a and a second coil spring 29b. The push rod 20 is connected to the brake pedal (not shown) and is moved in an axial direction in response to the movements of the brake pedal. The valve plunger 21 is connected with the left end of the push rod 20 by a well-known ball-joint mechanism.

The valve plunger 21 has a circular seat portion 21a at the rear end thereof. The control valve element 22 has a seal surface 22a which may contact and be separated from both the circular seat portion 21a of the valve plunger 21 and a valve seat 18b of the piston body 18 which is provided on a stepped portion of the hollow portion 18k of the piston body 18 at its front end portion. Accordingly, the valve seat 18b is positioned in a radially outward direction from the circular seat surface 21a. On the other hand, the rear end portion of the control valve element 22 is sealingly secured in an air-tight manner to an inside surface of the hollow portion 18k of the piston body 18. The seal surface 22a of the control valve element 22 is normally urged by the first coil spring 29a, disposed between the back surface of the seal surface 22a and a stepped portion of the push rod 20, toward the circular seat portion 21a of the valve plunger 21. The circular seat surface 21a of the valve plunger 21 is normally urged by the second coil spring 29b, disposed between a second retainer 31b secured to the hollow portion 18k and an engaging member engaged with the push rod 20, toward the seal surface 22a of the control valve element 22. Thereby, the seal surface 22a of the control valve 22 is normally in air-tight contact with the circular seat portion 21a of the valve plunger 21.

The control valve element 22 has a rolling portion 22b which is flexible in the axial direction so as to permit the seal surface 22a to follow the movement of the push rod 20. The rolling portion 22b includes a barrel-shaped portion 22b1 normally subject to atmospheric pressure and a flange portion 22b2 normally subject to negative pressure (vacuum) at its radially inner and outer surfaces, respectively.

In this embodiment, the flange portion 22b2 is secured in an air-tight manner between a first retainer 31a secured to the hollow portion 18k of the piston body 18 and a second retainer 31b also secured to the hollow portion 18k. The first retainer 31a comprises a circular member 31a1 which has an inner flange portion and a tubular portion and which is made of a rubber material, and a steel plate member 31a2 which is secured to the circular member 31a1. The first retainer 31a is secured to the hollow portion 18k in a pressing manner. Each inner flange portion of the circular member 31a1 and the plate member 31a2 extends to the inner circumference edge portion of the flange portion 22b2 along to the flange portion 22b1 of the rolling portion 22b at the outer surface of the control valve element 22. The second retainer 31b is secured to the tubular portion of the first retainer 31a and the hollow portion 18k of the piston body 18 in a pressing manner. The outer circumference portion of the control valve element 22 and the flange portion 22b2 of the rolling portion 22b are secured in an air-tight manner between the inner flange portion of the first retainer 31a and the inner flange portion of the second retainer 31b. The axial flexibility of the control valve element 22 in response to the axial movement of the push rod 20 is ensured at the barrel-shaped portion 22b1 which is radially thin.

A key member 28 is received in an opening 27 of the piston body 18 and is further engaged with a small diameter portion 21b of the valve plunger 21 through a slit portion of the key member 28. Thereby, the sliding distance of the valve plunger 21 with respect to the piston body 18 is limited by the key member 28. The key member 28 is substantially thinner than the axial extent of the small diameter portion 21b of the valve plunger 21 so as to create a distance A between both members. The key member 28 and the valve plunger 21 are permitted relative movement through the distance A. The axial length of the opening 27 is greater than the thickness of the key member 28 received therein so as to create a distance B between both members. The key member 28 and the piston body 18 are permitted relative movement through the distance B. The key member 28 is provided with a pair of arm portions (not shown) which extend along an outer circumference of the piston body 18. The arm portions can contact the inner surface of the rear shell 13 through a cushion member 32. The key member 28 is provided with a bent portion 28a which prevents the key member 28 from dropping out the piston body 18 due to its contact with the inner bead portion 15a.

When the vacuum brake booster 10 is not operated, the power piston 14 is maintained at the rearmost position by the return spring 30 as shown in FIG. 1. At this time, the arm portions of the key member are in contact with the inner surface of the rear shell 13 through the cushion member 32. In this situation, the rearmost positioning of the power piston 14 is limited due to the front-side surface of the opening 27 of the piston body 18 contacting the front-side surface of the key member 28. When the power piston 14 is maintained at the rearmost position as shown in FIG. 1, the seal surface 22a of the control valve element 22 is in contact with the circular seat surface 21a of the valve plunger 21 and separated a very small distance from the valve seat 18b. In the situation in which the power piston 14 is moved toward the constant pressure chamber 16 by the depression of the brake pedal, the arm portions of the key member 28 do not contact with the inner surface of the rear shell 13. The valve plunger 21 is moved toward the brake pedal until a face 21c of the valve plunger 21 contacts the key member 28 and makes the key member contact the rear-side surface of the opening 27 by the force of the first coil spring 29a and the second coil spring 29b when the brake pedal is released. Accordingly, the seal surface 22a of the control valve element 22 is separated from the valve seat 18b. Thereafter, when the cushion member 32 contacts the inner surface of the rear shell 13 and the movement of the valve plunger 21 and the push rod 20 is limited, the piston body 18 is moved a distance B against the force of the second coil spring 29b, with respect to the piston body 18, by the return spring 30. When the brake pedal is depressed, the valve plunger 21 is moved toward the constant pressure chamber 16 a maximum distance of A. Thereby, the seal surface 22a of the control valve element 22 contacts the valve seat 18b and separates from the circular seat portion 21a of the valve plunger 21.

Next, the structure for connecting the piston body 18 and the pressure plate 19 is described. As shown in FIG. 1, the pressure plate 19 has a cylindrical portion 19a formed in its inner circumference portion. The cylindrical portion 19a is received on an outer circumference portion 18g of the piston body 18 and is interrupted in its movement toward the constant pressure chamber 16 by contact between one end surface of the cylindrical portion 19a of the constant pressure chamber 16 side and a face 18c facing toward the variable pressure chamber 17 of the outer circumference portion 18g. The cylindrical portion 19a is provided with three hooked portions 19b which penetrate into the slits 18d formed on the piston body 18 at an end portion of its one end surface. The movement of the pressure plate 19 toward the variable pressure chamber 17 is interrupted by the contact between the hooked portions 19b and a bottom surface of a groove 18e formed on the piston body 18 at the same position along the circumference with respect to the slits 18d. The rotation of the pressure plate 19 with respect to the piston body 18 is interrupted by the contact between the hooked portions 19b and the side surface of the groove 18e. The hooked portion 19b has a straight shape before the pressure plate 19 is fitted on the outer circumference portion of the piston body 18 and is formed into a hook shape after the hooked portion 19b penetrate into the slits 18d. The groove 18f, in which the inner bead portion 15a of the diaphragm 15 is received in an air-tight manner, is formed on the outer circumference portion 18g of the piston body 18. The inner bead portion 15a of the diaphragm 15 is detachable from the groove 18f without releasing the connection between the piston body and the pressure plate 19. Furthermore, as shown in FIG. 1, a circular groove 18i, which has a sectional shape of a quarter of a circle, is formed between a face 18c in contact with one end surface of the cylindrical portion 19a and the groove 18f. A circular land portion 18h is formed between the groove 18f and the circular groove 18i. In the circular groove 18i, a rib portion 18j is formed so as to connect each slit 18d with the land portion 18h in the same plane, respectively. Accordingly, in the operating condition of the vacuum brake booster, the stress forces directed to the face 18c, created in order to interrupt the movements of the pressure plate 19 toward the constant pressure chamber 16, are dispersed by the circular groove 18i. Thereby, the piston body 18 is prevented from being damaged due to the concentration of stress. The rib portion 18j also has a guiding function for the hooked portion 19b so as not to deteriorate the performance of the installation between the pressure plate 19 and the piston body 18.

In operation, when the vacuum brake booster 10 is not operated, namely when the brake pedal is not depressed, as shown in FIG. 1, the seal surface 22a of the control valve element 22 is in air-tight contact with the circular seat portion 21a of the valve plunger 21, and is moved away or separated from the valve seat 18b of the piston body 18 by only a very small distance. Consequently, the negative pressure in the constant pressure chamber 16 is communicated to the variable pressure chamber 17 by the second air passages 34 and 35 provided in the piston body 18, through the clearance between the seal surface 22a of the control valve element 22 and the valve seat 18b of the piston body 18, and through a first air passage 33 provided in the piston body 18. The power piston 14 thus maintains its retracted position (shown in FIG. 1) by the urging force of the return spring 30. Therefore, a pressure differential is not produced between the constant pressure chamber 16 and the variable pressure chamber 17.

When the brake pedal is depressed, the push rod 20 is moved toward the constant pressure chamber 16 in the piston body 18 so as to move the valve plunger 21 in the same direction. Thereupon, the control valve element 22 is moved toward the constant pressure chamber 16 by the first coil spring 29a so that the control valve element 22 is seated on the valve seat 18b, thereby interrupting fluid communication between the constant pressure chamber 16 and the variable pressure chamber 17. When the brake pedal is further depressed from this stage, the push rod 20 pushes the valve plunger 21 toward the constant pressure chamber 17 as the push rod 20 compresses the first coil spring 29a and the second coil spring 29b. Thereupon, the circular seat portion 21a of the valve plunger 21 separates from the seal surface 22a of the control valve element 22. Consequently, ambient pressure is introduced into the variable pressure chamber 17 through the air passage holes of a boot member, the filters, the clearance between the seal surface 22a and the circular seat portion 21a and the second air passage 34 and 35 provided in the piston body 18. Due to the pressure differential between the constant pressure chamber 16 and the variable pressure chamber 17, propulsive force in the forward direction is produced in the power piston 14 so as to provide an assist operation.

Figure 3:
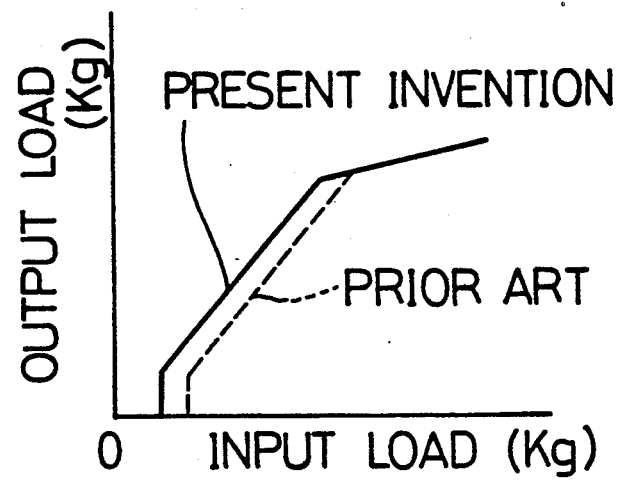
FIG. 3 is a diagram showing the relationship between the input load and the output load of the vacuum brake booster.

According to this embodiment, since the part of the control valve element 22 extending from the inner circumference edge portion of the flange portion 22b2 of the rolling portion 22b is secured in an air-tight manner between a first retainer 31a secured to the hollow portion 18k of the piston body 18 and the second retainer 31b secured to the hollow portion 18k and the first retainer 31a, the seal surface 22a of the control valve element 22 is not urged toward the valve seat 18b of the piston body 18 by a pressure differential applied to the flange portion 22b2, i.e., the flange portion 22b2 does not move with respect to the piston body 18. Therefore, the urging force of the second coil spring 29b which makes control valve element 22 separate from the valve seat 18b in the non-operating condition of the vacuum brake booster 10 is positively decreased without exerting an adverse influence to the control of the braking force of the vacuum brake booster 10. Accordingly, as shown in FIG. 3 which shows the relationship between the input load (kg) of the vacuum brake booster 10 and the output load (kg) of the vacuum brake booster 10, it is able to decrease the input load (kg) of the vacuum brake booster 10 as compared with the prior art. Thereby, according to this embodiment, the operational feel of the brake operation is improved.

Furthermore, as mentioned above, since the predetermined load of the second coil spring 29b is decreased, it is easy to design the second coil spring 29b in the limited space of the cylindrical portion 18a of the piston body 18. Thereby, the material used in the manufacture of the second coil spring 29b can be down-graded and manufacturing cost of the vacuum brake booster 10 is reduced. As mentioned above, the urging force of the return spring 30 is only set at a magnitude so as to move the power piston 14 when the brake pedal is released from its depressed condition. First, the power piston 14 is moved rightwardly in FIG. 1 when the valve plunger 21 is moved rightwardly by the second coil spring 29b so as to contact the face 21c with the key member 28 and to contact the key member 28 with the rear-side surface of the opening 27. Next, after unitary movement of the valve plunger 21 and the push rod 20 is limited by the contact between the cushion member 32 and the inner surface of the rear shell 13, the power piston 14 is moved rightwardly in FIG. 1 against the second coil spring 29b until the key member 28 comes into contact with the front side surface of the opening 27. Namely, the magnitude of the return spring 30 is determined in response to the predetermined load of the second coil spring 29b. Therefore, since the predetermined load of the second coil spring 29b can be reduced, the magnitude of the return spring 30 can be reduced. Accordingly, the manufacturing cost of the vacuum brake booster 10 can be further reduced.

Furthermore, in this embodiment, since the part of the control valve element 22 extending from the inner circumference edge portion of the flange portion 22b2 of the rolling portion 22b is secured in an air-tight manner between a first retainer 31a secured to the hollow portion 18k of the piston body 18 and the second retainer 31b secured to the hollow portion 18k and the first retainer 31a, the control valve element 22, the first coil spring 29a and the second coil spring 29b can be easily installed and assembled.

Figure 4:
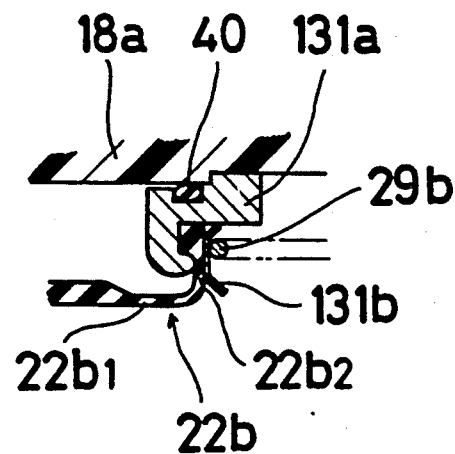
FIG. 4 is a partial sectional view of a second embodiment of the vacuum brake booster.

FIG. 4 shows a part of the second embodiment of the present invention. In this embodiment, a circular groove is formed on the outer circumference of the first retainer 131a and an O-ring 40 is installed on the circular groove provided in the first retainer 131a. The first retainer 131a is secured in an air-tight manner to the cylindrical portion 18a of the piston body 18 through the O-ring 40 by pressing. A circular ring 131b, provided as a second retainer, is secured to the inner circumference of the tubular portion of the first retainer 131a by pressing. As in the first embodiment described above, the outer circumference portion of the control valve element 22 and the flange portion 22b2 of the rolling portion 22b are secured in an air-tight manner between the circular ring 131b and the first retainer 131a. Accordingly, in this embodiment, the various effects of the first embodiment can be obtained.

Figure 5:
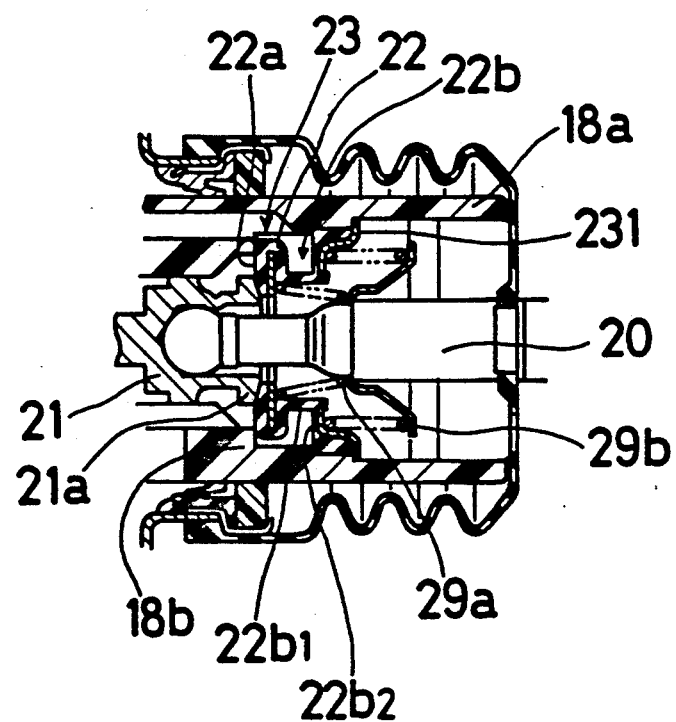
FIG. 5 is a partial sectional view of a third embodiment of the vacuum brake booster.

FIG. 5 shows the third embodiment of the present invention. In this embodiment, a retainer 231 has an inner circumference extended to the inner circumference edge portion of the flange portion 22b2 of the rolling portion 22b. The inner circumference of the retainer 231 is secured to the inner surface of the flange portion 22b2 by adhesion or by molding. Accordingly, in this embodiment, the various effects of the above embodiments can be obtained.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A vacuum brake booster comprising:
 a push rod movable in an axial direction in response to movement of a brake pedal;
 a housing including a front shell and a rear shell connected with each other;
 power piston means and a diaphragm located in the housing and dividing an interior of the housing into a constant pressure chamber and a variable pressure chamber, the power piston means being responsive to a pressure differential between the constant pressure chamber and the variable pressure chamber, a valve plunger operatively connected to a front end portion of the push rod and disposed within the power piston means;
 a control valve element disposed in the power piston means and having a seal surface normally in contact with a seat surface of the valve plunger by an urging force provided by a first urging means, the control valve element having a rolling portion under influence of atmospheric pressure at its radially outer surface and a negative pressure directed to its inner surface, respectively, and which includes a flange portion and a barrel-shaped portion flexible in an axial direction to respond to axial movement of the push rod, the control valve element being secured to a cylindrical portion of the power piston means by a securing means for engaging a second urging means for urging the push rod toward the brake pedal, said flange portion of said rolling portion being secured by said securing means in an air-tight manner, said flange portion of said rolling portion being spaced from the cylindrical portion of the power piston means by said securing means;
 the power piston means having a valve seat contactable with the control valve element so that a fluid communication between the constant pressure chamber and the variable pressure chamber is interrupted upon contact between said control valve element and said valve seat;
 the seat surface of the valve plunger being separable from the control valve element so as to produce the pressure differential between the constant pressure chamber and the variable pressure chamber; and
 said securing means securing the flange portion of the control valve element to the cylindrical portion of the power piston means to prevent relative movement between the flange portion of the control valve element and the power piston means.

2. A vacuum brake booster as recited in claim 1, wherein said securing means is a retainer.

3. A vacuum brake booster as recited in claim 2, wherein the retainer includes a first retainer secured to the cylindrical portion of the power piston means and a second retainer secured to the cylindrical portion of the power piston means, the flange portion of the rolling portion being secured in an air-tight manner between the first retainer and the second retainer.

4. A vacuum brake booster as recited in claim 2, wherein the retainer includes a first retainer secured to the cylindrical portion of the power piston means and a second retainer secured to the first retainer, the flange portion of the rolling portion being secured in an air-tight manner between the first retainer and the second retainer.

5. A vacuum brake booster as recited in claim 2, wherein the retainer is provided with an inner circumference portion extending to the inner circumference edge portion of the flange portion of the rolling portion and secured to the inner surface of the flange portion.

6. A vacuum brake booster as recited in claim 2, wherein the retainer includes a first retainer secured to and in contact with the cylindrical portion of the power piston means and a second retainer secured to and in contact with the cylindrical portion of the power piston means, the flange portion of the rolling portion being secured in an air-tight manner between the first retainer and the second retainer, and said flange portion of the rolling portion being in contact with the first retainer and the second retainer.

7. A vacuum brake booster as recited in claim 2, wherein the retainer includes a first retainer secured to and in contact with the cylindrical portion of the power piston means and a second retainer secured to and in contact with the first retainer, the flange portion of the rolling portion being secured in an air-tight manner between the first retainer and the second retainer, and said flange portion of the rolling portion being in contact with the first retainer and the second retainer.

8. A vacuum brake booster as recited in claim 1, wherein the flange portion of the rolling portion defines a free outer edge of the control valve element, said free outer edge of the control valve element defined by said flange portion not being in contact with the cylindrical portion of the power piston means.

9. A vacuum brake booster as recited in claim 1, wherein all portions of said control valve element are spaced from the cylindrical portion of the power piston means.

10. A vacuum brake booster as recited in claim 1, wherein no portion of said control valve element contacts the cylindrical portion of the power piston means.

11. A vacuum brake booster comprising:
 a push rod movable in an axial direction in response to movement of a brake pedal;
 a housing including a front shell and a rear shell connected with each other;
 power piston means and a diaphragm located in the housing and dividing an interior of the housing into a constant pressure chamber and a variable pressure chamber, the power piston means being responsive to a pressure differential between the constant pressure chamber and the variable pressure chamber, a valve plunger operatively connected to a front end portion of the push rod and disposed within the power piston means;
 a control valve element disposed in the power piston means and having a seal surface normally in contact with a seat surface of the valve plunger by an urging force provided by a first urging means, the control valve element having a rolling portion under influence of atmospheric pressure at its radially outer surface and a negative pressure directed to its inner surface, respectively, and which includes a flange portion and a barrel-shaped portion flexible in an axial direction to respond to axial movement of the push rod, the control valve element being secured to a cylindrical portion of the power piston means by a securing means for engaging a second urging means for urging the push rod toward the brake pedal, said flange portion of said rolling portion being secured by said securing means in an air-tight manner, the entire rolling portion being spaced from the cylindrical portion of the power piston means;

the power piston means having a valve seat contactable with the control valve element so that a fluid communication between the constant pressure chamber and the variable pressure chamber is interrupted upon contact between said control valve element and said valve seat;

the seat surface of the valve plunger being separable from the control valve element so as to produce the pressure differential between the constant pressure chamber and the variable pressure chamber; and said securing means securing the flange portion of the control valve element to the cylindrical portion of the power piston means to prevent relative movement between the flange portion of the control valve element and the power piston means.

12. A vacuum brake booster as recited in claim 11, wherein said securing means is a retainer.

13. A vacuum brake booster as recited in claim 12, wherein the retainer includes a first retainer secured to and in contact with the cylindrical portion of the power piston means and a second retainer secured to and in contact with the cylindrical portion of the power piston means, the flange portion of the rolling portion being secured in an air-tight manner between the first retainer and the second retainer, and said flange portion of the rolling portion being in contact with the first retainer and the second retainer.

14. A vacuum brake booster as recited in claim 12, wherein the retainer includes a first retainer secured to and in contact with the cylindrical portion of the power piston means and a second retainer secured to and in contact with the first retainer, the flange portion of the rolling portion being secured in an air-tight manner between the first retainer and the second retainer, and said flange portion of the rolling portion being in contact with the first retainer and the second retainer.

* * * * *